UNITED STATES PATENT OFFICE.

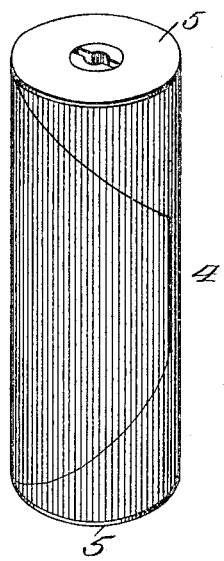
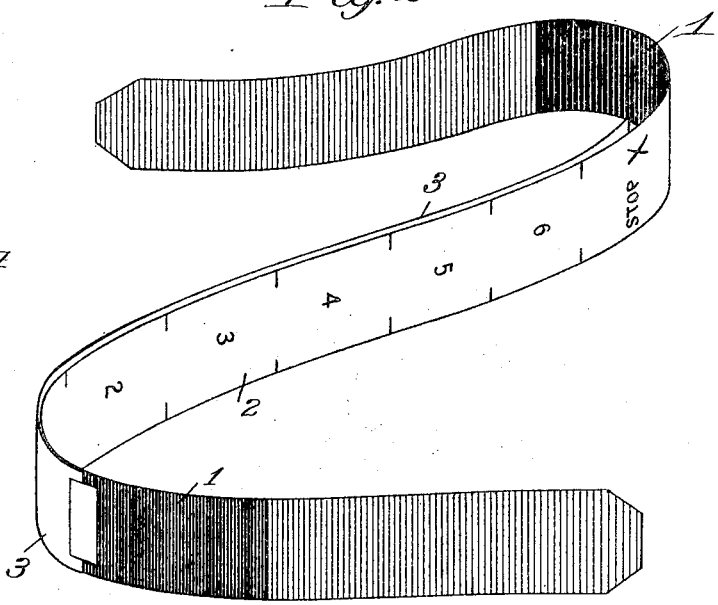
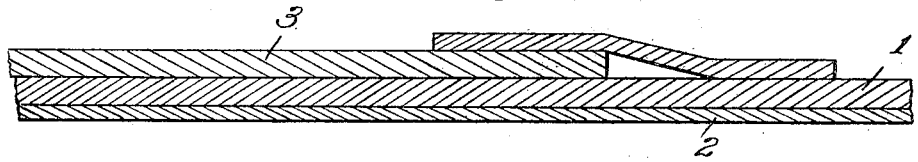

HARRY LE B. GRAY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

No. 807,458.    Specification of Letters Patent.    Patented Dec. 19, 1905.

Application filed March 20, 1905. Serial No. 250,948.

*To all whom it may concern:*

Be it known that I, HARRY LE B. GRAY, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of this specification, and to the reference-numerals marked thereon.

My present invention relates to photographic-film cartridges of the type embodying generally a strip of sensitized photographic film attached at one end to a strip of opaque material, such as black paper, and wound with the paper upon a flanged spool, said paper serving as a covering for the film, permitting the cartridge to be inserted and removed from the container, such as cameras and roll-holders, in daylight, and the markings or indicia for determining the different exposures of the film being indicated upon the back of the opaque paper and viewed through a suitable opening in the container.

In constructing film-cartridges of this general type it is necessary that the covering or backing upon the film be made of paper or some flexible material which is impervious to the actinic rays of light, and experiment has demonstrated that about the only practical and efficient covering of this character which is cheap enough for practical use is a relatively heavy black paper in which the coloring-matter extends through or is thoroughly incorporated with the pulp of which it is formed, and the best results have been obtained by the use of a relatively heavy paper made from black rags. The markings upon this paper for indicating the severing-lines and the different exposures have been formed of characters printed upon it in what may be termed a "white" ink or an insoluble ink containing white pigment, such as zinc-white or baryta, and in which the pigment (the colored white particles) is held in suspension instead of in solution, and when the menstruum has dried out these particles fill the pores of the paper and produce a variation in the hygroscopic qualities of that portion of the paper on which they are located. The result of this is that when the film and paper are wound together in the spool or roll, the sensitized face of the film being brought in contact with the outer surface of the paper containing these markings, sensitive emulsion is so affected that the outlines of the characters are apparent in the negatives when developed. While it is believed that this action upon the film is due to the variation in the hygroscopic qualities of the paper, it is by no means certain; but whatever the action the defect in this method of marking the black paper is very apparent and causes the loss of much valuable film. Numerous remedies have been suggested; but, owing to the requirements of the perfect opacity of the covering-paper—the necessary capacity of the paper to retain markings which are readily visible through the red or yellow window through which they must be viewed at the back of the camera or roll-holder—no successful method of producing film-cartridges which will not show the markings has, so far as I am aware, been devised when the marks are so located on the paper as to be necessarily brought into contact with the surface of the film when wound in the roll.

My present invention obviates these defects hereinbefore noted by the employment of a flexible covering-strip of paper which is of such nature as to prevent the passage of actinic light and which also has an outer surface capable of receiving markings contrasting therewith in color or hue and in ink of such nature that they will not either directly or by association with the surface upon which they are placed cause the markings to show in the film.

To these and other ends the invention consists in certain improvements and combinations of parts, all as will be hereinafter more fully explained, the novel features being pointed out in the claims at the end of the specification.

In the drawings, Figure 1 is a perspective view of a film-cartridge embodying my invention. Fig. 2 is a perspective view of the cartridge opened, showing the marks upon the rear of the covering-paper; and Fig. 3 is a longitudinal sectional view of the film and backing or covering.

Similar reference-numerals in the several figures indicate similar parts.

In the embodiment shown, 1 indicates the covering, composed of a strip of black paper, preferably such as is made upon a "cylinder" paper-machine, united, preferably, during the process of making with an outer coating or sheet 2 of paper thinner and lighter in color and preferably made upon a "Fourdrinier" machine, the outer side of the latter having printed thereon the numerals or characters for indicating the film exposures, said marks being made, as stated, in an ink embodying, for instance, an anilin color in solution in a gelatin compound, and this outer surface is then coated with the usual coating or sizing of gelatin.

3 indicates the film, embodying generally a nitrocellulose base having a coating of gelatino-argentic emulsion and shorter than the covering-strip arranged intermediate the ends of the latter and attached thereto at one end only, so as to be moved by and with it through the holder.

4 indicates the spool having the flanges 5 at the ends.

In the present embodiment I employ for the outer covering or backing of the film an opaque paper which is made of black rags having its outer surface covered with a layer or coating considerably lighter in color and which may be formed either by the application of a separate sheet of lighter-colored paper sized with gelatin or by a coating of baryta with which a small quantity of gelatin has been incorporated. The indicating and severing marks upon this lighter covering or coating are made with an ink of a contrasting color or hue, such as black, possessing substantially the same hygroscopic qualities as the paper sizing or coating and the coloring-matter being so finely divided, so to say, that there will be no variation in the effect produced on the film by reason of the contact of the surface bearing the markings therewith. I therefore prefer to employ a marking-ink embodying a very finely divided coloring material as an anilin dye (black, for instance) contained in solution in gelatin and dextrine if the paper is sized with gelatin or with gelatin and dextrine. This ink is readily distinguishable from a pigment ink containing zinc-white, for instance, in which the white particles are only in mechanical mixture with their menstruum, and the ink does not, therefore, have the same hygroscopic qualities as the paper or its coating or sizing.

I claim as my invention—

1. A photographic-film cartridge composed of a strip of flexible sensitized film and a covering-strip or backing of flexible opaque material to which the film is attached at one end and wound with it into spiral form, said covering-strip having upon its outer side characters or markings for indicating the separate film exposures, printed in ink containing in solution matter contrasting in color or shade with the surface of the opaque material to which they are applied, and having the same relative hygroscopic qualities as said surface.

2. A photographic-film cartridge composed of a strip of flexible sensitized film and a flexible covering-strip or backing of flexible opaque material to which the film is attached at one end and wound with it into spiral form, said covering-strip having its outer surface relatively lighter in shade than its surface next the film and provided with characters or markings on said outer surface indicating the separate film exposures and printed in an ink containing in solution matter contrasting in color or shade therewith and of substantially the same hygroscopic qualities.

3. A photographic-film cartridge composed of a strip of flexible sensitized film and a flexible covering-strip or backing of opaque black paper to which the film is attached at one end and wound with it into spiral form, said paper strip having formed upon its outer surface a coating lighter in color or shade upon which are applied characters for indicating the separate film exposures in an ink of a contrasting hue and of substantially the same hygroscopic qualities as said surface.

4. A photographic-film cartridge composed of a strip of flexible sensitized film and a flexible paper covering-strip or backing to which the film is attached at one end and wound with it into spiral form, said paper covering-strip embodying an inner black, opaque paper lining and an outer paper of lighter hue, upon which latter are characters for indicating the separate film exposures in an ink containing in solution matter differing in hue from that of said outer paper and having substantially the same hygroscopic qualities.

HARRY LE B. GRAY.

Witnesses:
F. F. CHURCH,
G. WILLARD RICH.